United States Patent
Araki et al.

(10) Patent No.: US 6,242,516 B1
(45) Date of Patent: *Jun. 5, 2001

(54) RUBBER COMPOSITION AND PNEUMATIC TIRE USING SAID RUBBER COMPOSITION

(75) Inventors: Shunji Araki; Kazuhiro Yanagisawa, both of Tokyo (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/934,394

(22) Filed: Sep. 19, 1997

(30) Foreign Application Priority Data

Dec. 16, 1996 (JP) .................................... 8-335974

(51) Int. Cl.$^7$ ....................................... C08K 5/54
(52) U.S. Cl. ...................... 524/267; 524/525; 524/526; 524/495
(58) Field of Search .................. 524/525, 526, 524/267, 495

(56) References Cited

U.S. PATENT DOCUMENTS

| | | | |
|---|---|---|---|
| 4,383,085 | * 5/1983 | Fujimaki et al. | 525/196 |
| 5,447,971 | 9/1995 | Bergh et al. | 523/213 |
| 5,496,883 | * 3/1996 | Hamada | 524/492 |
| 5,534,574 | 7/1996 | Sandstrom et al. | 524/262 |
| 5,726,237 | * 3/1998 | Satoh et al. | 524/495 |

FOREIGN PATENT DOCUMENTS

| | | | |
|---|---|---|---|
| 2104528 | 11/1994 | (CA) . | |
| 2129281 | 11/1995 | (CA) . | |
| 50-29741 | 9/1975 | (JP) | C08J/3/24 |
| 51-20208 | 6/1976 | (JP) | C08L/7/00 |
| 62-10530 | 3/1987 | (JP) | C08L/15/00 |
| 3-252431 | 11/1991 | (JP) | C08L/9/00 |
| 3-252433 | 11/1991 | (JP) | C08L/21/00 |
| 4-224840 | 8/1992 | (JP) | C08L/9/00 |
| 5-51484 | 3/1993 | (JP) | C08L/7/00 |
| 5-271477 | 10/1993 | (JP) | C08L/21/00 |
| 7-1908 | 1/1995 | (JP) | B60C/1/00 |
| 7-48476 | 2/1995 | (JP) | C08L/7/00 |

* cited by examiner

Primary Examiner—David W. Wu
Assistant Examiner—Caixia Lu-Rutt
(74) Attorney, Agent, or Firm—Sughrue, Mion, Zinn, Macpeak & Seas, PLLC

(57) ABSTRACT

The present invention provides a rubber composition and a pneumatic tire using the rubber composition. A rubber composition which comprises: a blend rubber of a copolymer and other diene base rubbers, the copolymer being obtained by copolymerization of 1,3-butadiene and an aromatic vinylmonomer using an organic lithium compound as an initiator, the glass transition point of the copolymer being −50° C. or more, and the blend rubber comprising the copolymer in an amount of 20 parts by weight or more and the other diene base rubbers in an amount of 80 parts by weight or less per 100 parts by weight of the blend rubber; silica filler in an amount of 10 to 80 parts by weight per 100 parts by weight of the blend rubber; carbon black in an amount of 20 to 80 parts by weight per 100 parts by weight of the blend rubber; and a specific silane coupling agent, i.e., a bis (alkoxysilylalkyl) polysulfide having a polysulfide chain in which the distribution of sulfur is specified, in an amount of 1 to 20% by weight of the amount of silica. The pneumatic tire has excellent wet skid resistance, low rolling resistance, and abrasion resistance.

16 Claims, No Drawings

RUBBER COMPOSITION AND PNEUMATIC TIRE USING SAID RUBBER COMPOSITION

BACKGROUND OF THE INVENTION

1. Field of the Invention

The present invention relates to a rubber composition and to a pneumatic tire using the rubber composition, and more particularly, to a rubber composition and to a pneumatic tire using the rubber composition which has excellent braking ability on a wet road surface (hereinafter referred to as "wet skid resistance"), excellent rolling resistance, and excellent abrasion resistance.

2. Description of the Related Art

Recently, because of social requirements to save energy and to save resources, particularly to cut down fuel consumption of automobiles, a decrease in the rolling resistance of tires is also required. For example, Japanese Patent Application Publication No. Sho-62-10530 discloses a technology in which wet skid resistance, rolling resistance, and abrasion resistance of a pneumatic tire are improved by using a tin coupling polymer having a specific microstructure for tread rubber of a tire.

In this improved mechanism, a bonding portion between tin and carbon is cut during mixing of a rubber, the generated polymer radicals react with a quinone group on the surface of carbon black, and dispersion of the carbon black into the rubber is improved. In order to carry out the reaction efficiently, it is preferable that the mixing temperature of a rubber is high.

Further, Japanese Patent Application Laid-Open (hereinafter, "JP-A") No. Hei-3-252433 discloses a technology in which a polymer terminal is modified by an alkoxy group and the modified polymer is caused to react with silica. In order to cause to react the polymer terminal alkoxy group react with the silica, it is again preferable that the mixing temperature of a rubber is high.

As mentioned above, in any of the solution polymerization coupling polymers, it is necessary that the mixing temperature of a rubber is high for bringing out the characteristics sufficiently.

On the other hand, it has been reported that silica is used for the tread rubber composition of a tire in order to achieve low fuel consumption and good wet skid resistance of a tire. For example, in JP-A No. Hei-3-252431, JP-A No. Hei-4-224840, JP-A No. Hei-5-271477, JP-A No. Hei-5-51484, JP-A No. Hei-7-1908, and JP-A No. Hei-7-48476, silica is used for a tread rubber so as to achieve low fuel consumption, good wet skid resistance, and good abrasion resistance.

However, in a case in which silica is used into rubber, silica particles tend to cohere together due to hydrogen bonding of silanol groups which are functional groups on the surfaces of the silica particles. For improving the dispersion of silica particles into rubber, the mixing time must be increased. Moreover, the surfaces of the silica particles are acidic. Therefore, there are problems in that basic substances used as vulcanization accelerators are absorbed such that vulcanization is not carried out sufficiently, and a sufficient modulus of elasticity is not obtained.

In order to solve these problems, various types of silane coupling agents have been developed. For example, use of a silane coupling agent as a reinforcing material is described in Japanese Patent Application Publication No. Sho-50-29741. However, the use of a silane coupling agent as a reinforcing material is still insufficient for improving fracture properties, workability, and processability of a rubber composition to high standards. Rubber compositions in which a combination of silica and silane coupling agent is used as a reinforcing material are described in Japanese Patent Application Publication No. Sho-51-20208 and others. However, this method of using a combination of silica and silane coupling agent as a reinforcing material has a drawback in that flow of the uncured rubber composition is markedly inferior and workability and processability deteriorate, although reinforcement of the rubber composition can be remarkably improved and fracture properties are improved.

The drawbacks of the conventional technologies in which silane coupling agents are used arise due to the following mechanism. When the mixing temperature of rubber is low, the silanol group on the surface of the silica does not react sufficiently with the silane coupling agent, and as a result, the sufficient reinforcing effect is not obtained. Dispersion of the silica into the rubber is also inferior, and this causes deterioration of the low heat buildup property which is the strong point of a rubber composition containing silica. Moreover, some of the alcohol formed by the reaction of the silanol group on the surface of the silica and the silane coupling agent does not vaporize completely during mixing because of the low mixing temperature, and the residual alcohol in the rubber vaporizes during an extrusion process so as to form blisters.

On the other hand, when mixing is conducted at high temperatures of 150 ° C. or more, the silanol group on the surface of the silica and the silane coupling agent sufficiently react with each other, and as a result, the reinforcing property is improved. Because dispersion of the silica into the rubber is also improved, a rubber composition having a low heat buildup property is obtained, and the formation of blisters in an extrusion process is suppressed. However, in this temperature range, gelation of the polymer caused by the silane coupling agent takes place simultaneously, and the Mooney viscosity is markedly increased. Thus, processing in later stages becomes impossible in actuality.

As mentioned above, as long as a conventional silane coupling agent is used, a sufficient mixing cannot be effected at a high temperature. Accordingly, when carbon black and silica are combined, it is impossible to bring out sufficiently the characteristics of a so-called solution polymerization coupling polymer which is prepared by using an organic lithium initiator.

SUMMARY OF THE INVENTION

The present invention has solved the above-described drawbacks of conventional art, and the object thereof is to provide a rubber composition and a pneumatic tire using the rubber composition in which wet skid resistance, low rolling resistance, and abrasion resistance are improved by using, for a tread, a rubber composition, in which gelation of a polymer due to a silane coupling agent during mixing at high temperatures of 150° C. or more is suppressed and in which the reaction of carbon black with solution polymerization coupling polymer can take place efficiently without a deterioration in workability.

In order to achieve the above object, a rubber composition of the present invention comprises: a blend rubber of a copolymer and other diene base rubbers, the copolymer being obtained by copolymerization of 1,3-butadiene and an aromatic vinylmonomer using an organo lithium compound as an initiator, the glass transition point of the copolymer being −50° C. or higher; the blend rubber comprising the copolymer in an amount of 20 parts by weight or more and the other diene base rubbers in an amount of 80 parts by weight or less per 100 parts by weight of the blend rubber, silica filler in an amount of 10 to 80 parts by weight, preferably 15 to 60 parts by weight, per 100 parts by weight of the blend rubber; carbon black in an amount of 20 to 80 parts by weight, preferably 20 to 60 parts by weight, per 100 parts by weight of the blend rubber; and in an amount of 1 to 20% by weight, preferably 3 to 15% by weight, of the amount of silica, a silane coupling agent represented by following general formula (1):

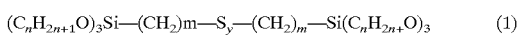

$$(C_nH_{2n+1}O)_3Si-(CH_2)m-S_y-(CH_2)_m-Si(C_nH_{2n+1}O)_3 \quad (1)$$

(wherein n represents an integer of 1 to 3, m represents an integer of 1 to 9, y represents a positive number of 1 or more which has a distribution), and in which the content of trisulfide silane is 20% or more based on the entire polysulfide silane, and the content of high polysulfide silane, in which y is 5 or a number larger than 5, is 50% or less.

It is preferable that the copolymer is a copolymer having a bond of tin and butadienyl group in a main chain or a silane compound modified copolymer which is obtained by reacting the polymerization active terminal thereof with an alkoxysilane compound.

It is preferable that the above-described alkoxysilane compound is a silane compound which comprises at least one alkoxy group in one molecule and is represented by the following general formula (2):

$$X_pSi(OR)_T R'_{4-P-T} \quad (2)$$

(wherein, X is a halogen atom which is either a chlorine atom, a bromine atom, or an iodine atom, R and R' are either an alkyl group, an aryl group, or a haloganated aryl group having 1 to 20 carbon atoms, T is an integer of 1 to 4, P is an integer of 0 to 2, and the sum of P and T is 2 to 4).

Further, it is preferable that the above-described alkoxysilane compound is one member selected from the group consisting of monoalkyltriaryloxysilane and tetraaryloxysilane.

Further, it is preferable that the content of trisulfide silane in the polysulfide silane coupling agent molecule represented by the above general formula (1) is 30% or more based on the entire polysulfide silane and that the content of high polysulfide silane, in which y is 5 or a number larger than 5, is 40% or less based on the entire polysulfide silane.

Moreover, it is preferable that a nitrogen absorption specific surface area ($N_2SA$) of the carbon black is 70 to 150 $m^2$/g and a dibutyl phthalate oil absorption (DBP) thereof is 120 to 200 ml/100 g.

It is preferable that the sum of the amount of carbon black and the amount of silica is 30 to 120 parts by weight per 100 parts by weight of the blend rubber and that a weight ratio of the amount of the carbon black to the amount of the silica is 1:0.5 to 1:15.

Furthermore, the present invention relates to a pneumatic tire which is manufactured by using the above-mentioned rubber composition for tread rubber.

DESCRIPTION OF THE PREFERRED EMBODIMENTS

A copolymer used in the present invention, which is obtained by copolymerization of 1,3-butadiene and an aromatic vinylmonomer using an organo lithium compound as an initiator, can be manufactured in accordance with a known manufacturing method. An inert organic solvent used for manufacturing includes, for example, pentane, hexane, cyclohexane, heptane, benzene, xylene, toluene, tetrahydrofuran, diethyl ether, and the like.

An aromatic vinylmonomer used in the present invention includes, for example, a styrene, α-methylstyrene, 1-vinylnaphthalene, 3-vinyltoluene, ethylvinylbenzene, divinylbenzene, 4-cyclohexylstyrene, 2, 4, 6-trimethylstyrene, and the like. Among them, styrene is preferable.

Firstly, copolymerization of 1, 3-butadiene and, for example, styrene is carried out. An organo lithium metal catalyst used for polymerization includes n-butyllithium, sec-butyllithium, t-butyllithium, alkllithium such as a reaction product of butyllithium and divinylbenzene, alkylenedilithium such as 1,4-dilithiumbutane, phenyllithium, stilbenedilithium, diisopropenylbenzenedilithium, lithiumnaphtalene, and the like. In copolymerization, Lewis base, which is a randomizer and a modifier for a microstructure of butadiene unit in a copolymer, can be used as occasion demands. More specifically, the Lewis base includes ethers and tertiary amines such as dimethoxybenzene, tetrahydrofuran, dimethoxyethane, diethyleneglycoldibutylether, diethyleneglycoldimethylether, triethylamine, pyridine, N-methylmorpholine, N, N, N', N'-tetramethylethylenediamine, 1, 2-dipiperidinoethane or the like.

In a polymerization method for manufacturing a living polymer, the inert organic solvent, monomers (i.e., 1, 3-butadiene and e.g., styrene), an organo lithium metal catalyst, and further, a Lewis base (if necessary) are charged together, added intermittently, or added successively into a rector in a polymerization system which is purged with nitrogen. The polymerization is thereby carried out.

The polymerization temperature is normally −120° C. to +150° C., preferably −80° C. to +120° C. The polymerization time is normally 5 minutes to 24 hours, preferably 10 minutes to 10 hours.

The polymerization temperature may be constant within the above temperature range, or may be raised or under adiabatic condition. Further, the polymerization reaction may be a batch type or a continuous type.

The concentration of monomer in the solvent is normally 5 to 50% by weight, preferably 10 to 35% by weight.

Moreover, when the living polymer is manufactured, in order to prevent deactivation of the organo lithium metal catalyst and the living polymer, it is necessary to avoid mixing into the polymerization system a compound having deactivating function such as a halogen compound, oxygen, water or carbonic acid gas.

It is necessary that the glass transition point of the copolymer used in the present invention is −50° C. or more, preferably −40° C. or more. When the glass transition point is less than −50° C., the wet skid resistance is poor. Further, the content of bonded styrene of polymer obtained by the copolymer of 1,3-butadiene and styrene is preferably 15 to 50% by weight.

The copolymer having the bond of tin and butadienyl group in a main chain used in the present invention can be manufactured in accordance with the following method.

The bonding of tin and butadienyl group in the main chain of polymer is obtained by the steps of: polymerizing 1, 3-butadiene and styrene by using an organo lithium compound as mentioned above; adding a small amount of 1, 3-butadiene to the polymerization solution; adding a haloganated tin thereto; and effecting coupling reaction.

Further, the silane compound modified copolymer used in the present invention can be manufactured in accordance with the following method.

The silane compound modified copolymer used in the present invention is a modified rubbery copolymer having Si—OR bond (wherein, R is an alkyl group, an aryl group, or a haloganated aryl group having 1 to 20 carbon atoms) which is obtained by reacting the following specific silane compound with the aforementioned active terminal of living polymer.

The silane compound reacted with the living polymer is a silane compound which comprises at least one alkoxy group in one molecule and is represented by the following general formula (2):

$$X_p Si(OR)_T R'_{4-P-T} \quad (2)$$

(wherein, X is a halogen atom which is either a chlorine atom, a bromine atom, or an iodine atom, R and R' each independently are either an alkyl group, an aryl group, or a haloganated aryl group having 1 to 20 carbon atoms, T is an integer of 1 to 4, P is an integer of 0 to 2, and the sum of P and T is 2 to 4).

As the silane compound, it is preferable that the OR group is non-hydrolytic, i.e., the OR group is an alkoxy group, an aryloxy group, or a cycloalkoxy group which has 4 to 20 carbons and which is non-hydrolytic. In particular, it is preferable that R of the OR group has a hydrocarbon group in which 3 carbon atoms bond to the α-position carbon, or a hydrocarbon group in which hydrocarbon group(s) having 1 or more carbon atoms bond to the β-position carbon, or an aromatic hydrocarbon group represented by a phenyl group or a tolyl group.

Further, as R', an alkyl group includes a methyl group, an ethyl group, an n-propyl group, a t-butyl group, and the like; an aryl group includes a phenyl group, a tolyl group, a naphthyl group, and the like; and a halogenated alkyl group includes a chloromethyl group, a bromomethyl group, an iodomethyl group, and a chloroethyl group, and the like.

In the above-described general formula (2), when P is 0 and T is 2, dialkyldialkoxysilane or the like is used; when P is 0 and T is 3, monoalkyltrialkoxysilane or the like is used; when P is 0 and T is 4, tetraalkoxysilane or the like is used; when P is 1 and T is 1, monohalogenated dialkylmonoalkoxysilane or the like is used; when P is 1 and T is 2, monohalogenated monoalkyldialkoxysilane or the like is used; when P is 1 and T is 3, monohalogenated trialkoxysilane is used; when P is 2 and T is 1, dihalogenated monoalkylmonoalkoxysilane or the like is used; when P is 2 and T is 2, dihalogenated dialkoxysilane or the like is used. All of them are compounds which have reactivities with active terminals of living polymer.

In particular, monoalkyltriaryloxysilane (P is 0 and T is 3) and tetraaryloxysilane (P is 0 and T is 4) are preferable in that processability is improved by coupling a living polymer and that a functional group whose affinity for silica or the like is high is applied to a polymer.

The other diene base rubber which can be used in the present invention includes polybutadiene rubber, natural rubber, synthetic 1,4-polyisoprene rubber, butyl rubber, and halogenated butyl rubber.

The silica used in the present invention is a synthetic silica manufactured by a precipitation process. Specific examples of the silica include NIPSIL AQ manufactured by NIPPON SILICA INDUSTRIAL Co., Ltd.; ULTRASIL VN3 and BV 3370GR manufactured by DEGUSSA AG., a German company; RP1165MP, Zeosil 165GR, and Zeosil 175MP manufactured by RHÔNE-POULENC Co.,; and Hisil233, Hisil210, and Hisil255 manufactured by PPG Co. (all trade names). However, the silica used in the present invention is not limited to these examples. The amount of silica used is 10 to 80 parts by weight, preferably 15 to 60 parts by weight, per 100 parts by weight of diene base rubber. When the amount of silica is less than 10 parts by weight, wet skid resistance deteriorates. On the other hand, when the amount of silica exceeds 80 parts by weight, low rolling resistance deteriorates.

The amount of carbon black which is used along with silica as a filler in the present invention is 20 to 80 parts by weight, preferably 20 to 60 parts by weight, per 100 parts by weight of diene base rubber. When the amount of carbon black is less than 20 parts by weight, the tensile strength at the time of cutting of a rubber is low and abrasion resistance deteriorates. On the other hand, when the amount of carbon black exceeds 80 parts by weight, low rolling resistance deteriorates. The carbon black, which has a nitrogen absorption specific surface area ($N_2SA$) of 70 to 150 $m^2$/g and has a dibutyl phthalate oil absorption (DBP) of 120 to 200 ml/100 g, is preferably used. DBP is determined in accordance with ASTM D2414-93 and $N_2SA$ is determined in accordance with ASTM D4820.

The sum of the amount of carbon black and silica is preferably 30 parts by weight or more and 120 parts by weight or less, more preferably 40 parts by weight or more and 100 parts by weight or less, per 100 parts by weight of a rubber component. Moreover, the weight ratio of the amount of carbon black to the amount of silica is preferably from 1:0.5 to 1:15. When the sum of the amount of silica and carbon black is less than 30 parts by weight, abrasion resistance deteriorates. When the sum of the amount of silica and carbon black exceeds 120 parts by weight, low rolling resistance deteriorates. When the amount of carbon black is too small, fracture strength decreases. On the contrary, when the amount of carbon black is too large, wet skid resistance decreases.

The silane coupling agent used in the present invention is a silane coupling agent represented by following general formula (1):

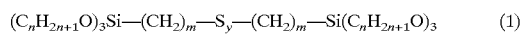

$$(C_nH_{2n+1}O)_3Si{-}(CH_2)_m{-}S_y{-}(CH_2)_m{-}Si(C_nH_{2n+1}O)_3 \quad (1)$$

(wherein n represents an integer of 1 to 3, m represents an integer of 1 to 9, and y represents a positive number of 1 or more which has a distribution). It is necessary that the content of trisulfide silane is 20% or more, preferably 30% or more, based on the entire polysulfide silane and that the content of high polysulfide silane, in which y is 5 or a number larger than 5, is 50% or less, preferably 40% or less. By using this silane coupling agent, gelation of a polymer during mixing at high temperatures of 150° C. or more is suppressed, and the reduction of productivity due to the increase in the Mooney viscosity can be prevented.

The amount of silane coupling agent is 1 to 20% by weight, preferably 3 to 15% by weight, of the weight of silica. When the amount of silane coupling agent is less than 1% by weight, the coupling effect is small. On the other hand, when the amount of silane coupling agent exceeds 20% by weight, the gelation of a polymer occurs. Therefore, such amounts are not preferable.

To effectively exhibit the characteristics of the rubber composition applied to the present invention, the mixing temperature is preferably 150° C. or more and 180° C. or less. When the mixing temperature is lower than 150° C., the silane coupling agent does not react sufficiently with the silica, and blisters are formed during extrusion. On the other hand, when the temperature exceeds 180° C., gelation of the polymer takes place such that the Mooney viscosity increases. Therefore, such temperatures are not preferable from the standpoint of processing.

The mechanism for preventing gelation of a polymer and improving abrasion resistance at a mixing temperature of 150° C. or more is described hereinafter on the basis of the results of studies and considerations of the results.

A silane coupling agent generally used in the tire industry (trade name: Si69, manufactured by DEGUSSA AG., a German company) was heated in an oven at 150° C. for 2 hours and cooled. Thereafter, the treated silane coupling agent was analyzed by high performance liquid chromatography. It was confirmed from the results of the analysis that the components having sulfur chains of —$S_6$— or longer in the molecule were decreased as compared to the original material, and the free sulfur and components having sulfur chains of —$S_4$— or shorter in the molecule were increased as compared to the original material. In other words, it was thought that the components having sulfur chains of —$S_6$— or longer in the molecule were decomposed by the heating at a high temperature. It can be surmised that gelation of a polymer takes place during mixing at a high temperature because radicals are formed during the decomposition of the silane coupling agent or because products formed by the decomposition work as a source of sulfur. Therefore, it was believed that gelation of a polymer is suppressed during mixing at temperatures of 150° C. or more when the silane coupling agent originally contains smaller amounts of the components having long sulfur chains in the molecule. As the result of intensive studies in accordance with the above idea, it was found that, when the proportion of the components having short sulfur chains in the molecule among the components having sulfur chains of various lengths in the molecule was increased to a specific value or more, gelation of the polymer was actually suppressed. Moreover, dispersion of silica into rubber was improved because the reaction of the silanol group on the surface of the silica and the silane coupling agent took place sufficiently due to mixing at a high temperature, and abrasion resistance was improved.

Into the rubber composition of the present invention, compounding ingredients which are generally used such as antioxidants, zinc oxide, stearic acid, softeners can be mixed.

EXAMPLES

The present invention is described more specifically with reference to the following Examples.

Various rubber compositions were prepared in accordance with the formulations given in the following Tables 3 and 4. The silane coupling agents used in the formulations are expressed by the following formula:

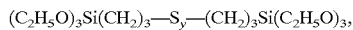

and —$S_y$— in this formula has the distribution shown in Table 1. The distributions of various sulfur chain components (—$S_y$—) shown in Table 1 were obtained by calculation from peak areas (%) obtained by high performance liquid chromatography (HPLC). The analysis by HPLC is described in detail hereinafter.

(Conditions of analysis by HPLC)

HPLC: manufactured by TOSOH CORPORATION, HLC-8020

UV detector: manufactured by TOSOH CORPORATION, UV-8010 (254 nm)

Recorder: manufactured by TOSOH CORPORATION, SUPER SYSTEM CONTROLLER SC-8010

Column: manufactured by TOSOH CORPORATION, TSK-gel ODS-80$T_M$CTR (inner diameter: 4.6 mm, length: 10 cm)

Temperature at the time of measurement: 25° C.

Concentration of sample: 6 mg/10 cc (6 mg per 10 cc of) acetonitrile solution

Amount of sample injected: 20 μl

Condition of elusion: flow rate of 1 cc/min

A sample was eluted for 2 minutes with a mixed solution of acetonitrile and water having a fixed composition of 1:1, and then with a mixed solution having a varying composition with such a gradient that the solution contained 100% of acetonitrile after 18 minutes.

TABLE 1

| | -$S_2$- | -$S_3$- | -$S_4$- | -$S_5$- | -$S_6$- | -$S_7$- | -$S_8$- | -$S_9$- | -$S_5$- or more |
|---|---|---|---|---|---|---|---|---|---|
| sample A*[1] | 2.53 | 15.85 | 23.77 | 24.27 | 18.33 | 10.24 | 3.83 | 1.18 | 57.85 |
| sample B | 7.16 | 30.33 | 29.38 | 18.29 | 8.24 | 3.28 | 0.96 | 2.36 | 33.13 |
| sample C | 17.64 | 44.14 | 23.40 | 8.49 | 1.92 | 1.06 | 3.37 | 0 | 14.83 |
| sample D | 8.1 | 59.0 | 18.7 | 14.2 | 0 | 0 | 0 | 0 | 14.2 |
| sample E | 11.1 | 62.8 | 26.1 | 0 | 0 | 0 | 0 | 0 | 0 |
| sample F | 97.3 | 2.7 | 0 | 0 | 0 | 0 | 0 | 0 | 0 |

Samples A to F in Table 1 were obtained as follows.

Sample A

Si69, manufactured by DEGUSSA AG., a German company

Samples B and C

Samples B and C were synthesized in accordance with the method described in JP-A No. Hei-7-228588 from anhydrous sodium sulfide and sulfur in the following mol ratios:

sample B 1:2 sample C 1:1.5

Sample D 506 g (1 mol) of sample B which has a polysulfide distribution shown in Table 1 was weighed and charged into a 1-litre flask. 78.7 g (0.3 mol) of triethyl phosphite was added dropwise into the flask through a dropping funnel over 2 hours while stirring the solution within the flask. During this time, the temperature within the flask rose from 25° C. to 50° C. The stirring was conducted for another 3 hours and a portion of the solution was checked through gas chromatography. It was found that a peak assigned to triethyl phosphite was diminished and that the reaction took place. Table 1 shows the results of measurement of polysulfide distributions in the obtained composition through liquid chromatography. It shows that high polysulfide portions selectively reacted with the phosphite.

Sample E 538 g (1 mol) of silane (sample A: Si69 manufactured by DEGUSSA AG., a German company), which has the polysulfide distribution shown in Table 1 and which has an average of four sulfur atoms per polysulfide chain, was weighed and charged into a 1-litre flask. 166.2 g (1 mol) of triethyl phosphite was added dropwise into the flask through a dropping funnel over 2 hours while stirring the solution within the flask. During this time, the flask was cooled by water in order to maintain the temperature therewithin at 50° C. or lower. Next, the flask was heated and stirred for 3 hours at 40 to 50° C. Thereafter, sample E was obtained in the same way as sample D.

Sample F

Sample F was synthesized in accordance with the method described in JP-A No. Hei-8-259739.

Further, the structures and physical properties of a solution polymerized SBR used as a rubber component are illustrated in the following Table 2. In Table 2, solution polymerized SBR's I to IV were synthesized in accordance with a method described in Japanese Patent Application Publication No. Sho-62-10530, and solution polymerized SBR's V to VII were synthesized in accordance with a method described in JP-A No. Hei-3-252433.

the stopping thereof was measured, and the wet skid resistance of the test tire was evaluated in accordance with the following formula:

{(stopping distance of tire of Comparative Example 1)/ (stopping distance of test tire)}×100.

The larger the numerical value of the index, the better the wet skid resistance.

(3) Rolling Resistance

The tire prepared above was attached to a rim 6JJ, inflated to an inner pressure of 2.0 kg/cm, and under a load of 440 kg, was made to contact a drum having an outer diameter of 1.7 m, and the drum was rotated. The speed was increased to 120 km/hour, and then the drum was allowed to rotate inertially. The moment of inertia was measured when the speed reached 80 km/hour. Rolling resistance was evaluated from the obtained moment of inertia in accordance with the following equation:

index=[(moment of inertia of tire of Comparative Example 1)/(moment of inertia of sample tire)]×100

TABLE 2

| | Solution polymerized SBR | | | | | | |
|---|---|---|---|---|---|---|---|
| | I | II | III | IV | V | VI | VII |
| Amount of styrene (% by weight) | 30 | 30 | 15 | 30 | 25 | 50 | 25 |
| Amount of vinyl bond (% by weight) | 65 | 65 | 30 | 65 | 50 | 60 | 50 |
| Rate of chains containing butadienyl-tin bond(ing) (% by weight) | 30 | 70 | 30 | 0 | 0 | 0 | 0 |
| Alkoxysilane | — | — | — | — | tetraphenoxysilane | — | monomethyltriphenoxysilane |
| Glass transition point Tg (° C.) | −22 | −22 | −61 | −22 | −37 | −58 | −38 |

By using the obtained coupling agents and copolymers, respective rubber compositions are obtained in accordance with formulations shown in Tables 3 and 4.

These rubber compositions were applied to the treads of 185/60R14 size pneumatic tires for a passenger car and various types of tires were manufactured.

The obtained rubber compositions were evaluated with respect to Mooney viscosity in accordance with the following method of evaluation. Further, the manufactured tires were evaluated with respect to wet skid resistance, rolling resistance, and abrasion resistance in accordance with the following methods.

(1) Mooney Viscosity

Mooney viscosity was measured in accordance with the method of Japanese Industrial Standard K6300 for a time of 4 minutes at a temperature of 130° C. after preheating for 1 minute. The obtained result is expressed as an index with Comparative Example 1 being 100. The smaller the index, the lower the Mooney viscosity and the better the processability.

(2) Wet Skid Resistance

On a wet concrete road surface on which there is water of 3 mm depth, rapid braking is applied at a speed of 80 km/hour. The distance between the locking of wheels and The calculated value is expressed as an index with the value of Comparative Example 1 being set to 100. The larger the index, the better the row rolling resistance property.

(4) Abrasion Resistance

Four test tires were placed on a 2000 cc passenger vehicle.

After the vehicle was run about 30,000 km, the depth of a groove remained at the tire was measured. The abrasion resistance was determined in accordance with the following formula: {(running distance (km) of test tire)/(depth (mm) of initial groove−depth (mm) of groove remained at the tire after the running)}/{(running distance (km) of tire of Comparative Example 1)/(depth (mm) of initial groove −depth (mm) of groove remained at tire of Comparative Example 1 after the running)}. The larger the numerical value of the index, the better the abrasion resistance.

The obtained results are illustrated in the following Tables 3 and 4.

TABLE 3

| Example | | 1 | 2 | | 3 | 4 | | 5 | 6 | 7 | 8 |
|---|---|---|---|---|---|---|---|---|---|---|---|
| Comparative Example | | 1 | | 2 | | | 3 | | | | |
| Formulation (parts by weight) | | | | | | | | | | | |
| natural rubber | | 70 | 70 | 70 | 70 | 70 | 70 | 70 | 70 | 70 | 70 | 70 |
| 1500*[1] | | 30 | — | — | — | — | — | — | — | — | — | — |
| solution | type | — | I | II | III | IV | V | VI | VII | II | II | II |
| polymerized SBR | amount | — | 30 | 30 | 30 | 30 | 30 | 30 | 30 | 30 | 30 | 30 |
| silica*[2] | | 30 | 30 | 39 | 30 | 30 | 30 | 30 | 30 | 30 | 30 | 30 |
| carbon black *[3] | type | N234 | N234 | N234 | N234 | N234 | N234 | N234 | N234 | N234 | N234 | N234 |
| | amount | 30 | 30 | 30 | 30 | 30 | 30 | 30 | 30 | 30 | 30 | 30 |
| silane coupling | type | A | C | C | C | C | C | C | C | B | D | E |
| agent | amount | 3.0 | 3.0 | 3.0 | 3.0 | 3.0 | 3.0 | 3.0 | 3.0 | 3.0 | 3.0 | 3.0 |
| aromatic oil | | 10 | 10 | 10 | 10 | 10 | 10 | 10 | 10 | 10 | 10 | 10 |
| stearic acid | | 2.0 | 2.0 | 2.0 | 2.0 | 2.0 | 2.0 | 2.0 | 2.0 | 2.0 | 2.0 | 2.0 |
| zinc oxide | | 3.0 | 3.0 | 3.0 | 3.0 | 3.0 | 3.0 | 3.0 | 3.0 | 3.0 | 3.0 | 3.0 |
| N-oxydiethylene-2-benzothiazolesulfenamide | | 0.6 | 0.6 | 0.6 | 0.6 | 0.6 | 0.6 | 0.6 | 0.6 | 0.6 | 0.6 | 0.6 |
| di-2-benzothiazoledisulfide (DM) | | 0.8 | 0.8 | 0.8 | 0.8 | 0.8 | 0.8 | 0.8 | 0.8 | 0.8 | 0.8 | 0.8 |
| N-isopropyl-N'-phenyl-P-phenylenediamine | | 1.0 | 1.0 | 1.0 | 1.0 | 1.0 | 1.0 | 1.0 | 1.0 | 1.0 | 1.0 | 1.0 |
| sulfur | | 1.5 | 1.5 | 1.5 | 1.5 | 1.5 | 1.5 | 1.5 | 1.5 | 1.5 | 1.5 | 1.5 |
| masterbatch temperature (° C.) | | 163 | 168 | 164 | 167 | 167 | 166 | 168 | 165 | 167 | 162 | 165 |
| Results of evaluation | | | | | | | | | | | | |
| Mooney viscosity (index) | | 100 | 72 | 74 | 72 | 75 | 76 | 78 | 77 | 89 | 84 | 82 |
| wet skid resistance (index) | | 100 | 108 | 109 | 90 | 107 | 104 | 97 | 106 | 108 | 106 | 110 |
| rolling resistance (index) | | 100 | 114 | 119 | 117 | 100 | 110 | 112 | 108 | 122 | 120 | 119 |
| abrasion resistance (index) | | 100 | 105 | 108 | 110 | 101 | 102 | 95 | 104 | 110 | 108 | 108 | masterbatch temperature: a measured temperature of masterbatch immediately after mixing

TABLE 4

| Example | | 9 | 10 | 11 | | 12 | | 13 | | | |
|---|---|---|---|---|---|---|---|---|---|---|---|
| Comparative Example | | 4 | | | 5 | | 6 | 7 | | 8 | |
| Formulation (parts by weight) | | | | | | | | | | | |
| natural rubber | | 70 | 70 | 40 | 30 | 30 | 70 | 40 | 70 | 40 | 40 |
| 1500*[1] | | — | — | 40 | 20 | 20 | — | 50 | — | — | — |
| solution | type | II | II | II | II | II | II | II | II | II | II |
| polymerized SBR | amount | 30 | 30 | 20 | 50 | 50 | 30 | 10 | 30 | 60 | 60 |
| silica*[2] | | 30 | 30 | 15 | 30 | 30 | 10 | 15 | 5 | 10 | 10 |
| carbon black *[3] | type | N234 | N582 | N582 | N234 | N234 | N234 | N582 | N234 | N234 | N234 |
| | amount | 30 | 25 | 40 | 30 | 30 | 30 | 40 | 50 | 75 | 85 |
| silane coupling | type | F | C | C | C | A | C | C | C | C | C |
| agent | amount | 3.0 | 3.0 | 1.5 | 3.0 | 3.0 | 1.0 | 1.5 | 0.5 | 1.0 | 1.0 |
| aromatic oil | | 10 | 10 | 10 | 10 | 10 | 10 | 10 | 10 | 10 | 10 |
| stearic acid | | 2.0 | 2.0 | 2.0 | 2.0 | 2.0 | 2.0 | 2.0 | 2.0 | 2.0 | 2.0 |
| zinc oxide | | 3.0 | 3.0 | 3.0 | 3.0 | 3.0 | 3.0 | 3.0 | 3.0 | 3.0 | 3.0 |
| N-oxydiethylene-2-benzothiazolesulfenamide | | 0.6 | 0.6 | 0.6 | 0.6 | 0.6 | 0.6 | 0.6 | 0.6 | 0.6 | 0.6 |
| di-2-benzothiazoledisulfide (DM) | | 0.8 | 0.8 | 0.8 | 0.8 | 0.8 | 0.8 | 0.8 | 0.8 | 0.8 | 0.8 |
| N-isopropyl-N'-phenyl-P-phenylenediamine | | 1.0 | 1.0 | 1.0 | 1.0 | 1.0 | 1.0 | 1.0 | 1.0 | 1.0 | 1.0 |
| sulfur | | 1.5 | 1.5 | 1.5 | 1.5 | 1.5 | 1.5 | 1.5 | 1.5 | 1.5 | 1.5 |
| masterbatch temperature (° C.) | | 168 | 164 | 165 | 162 | 164 | 166 | 162 | 164 | 168 | 170 |
| Results of evaluation | | | | | | | | | | | |
| Mooney viscosity (index) | | 65 | 82 | 92 | 78 | 151 | 68 | 96 | 78 | 93 | 101 |
| wet skid resistance (index) | | 112 | 110 | 114 | 116 | — | 102 | 111 | 96 | 102 | 104 |

TABLE 4-continued

| Example | | 9 | 10 | 11 | | 12 | | | 13 | |
|---|---|---|---|---|---|---|---|---|---|---|
| Comparative Example | 4 | | | | 5 | | 6 | 7 | | 8 |
| rolling resistance (index) | 107 | 114 | 104 | 126 | — | 128 | 98 | 102 | 103 | 94 |
| abrasion resistance (index) | 94 | 114 | 132 | 114 | — | 100 | 128 | 116 | 127 | 133 |

*[1]emulsion polymerization SBR (manufactured by JAPAN SYNTHETIC RUBBER Co., Ltd.)
*[2]NIPSIL AQ (manufactured by NIPPON SILICA INDUSTRIAL Co., Ltd.)
*[3]N234 ($N_2SA$: 126 $m^2$/g, DBP: 125 ml/100 g), N582 ($N_2SA$: 80 $m^2$/g, DBP: 180 ml/100 g)
(manufactured by ASAHI CARBON Co., Ltd.)
masterbatch temperature: a measured temperature of masterbatch immediately after mixing In Table 4, a tire of Comparative Example 5 cannot be manufactured due to the increase in Mooney viscosity.

Because the rubber composition of the present invention uses a silane coupling agent having a specific distribution of polysulfide, gelation of a polymer due to the silane coupling agent is suppressed during mixing at high temperatures of 150° C. or more. The reaction of the carbon black and the solution polymerization tin or silane modified polymer can efficiently be conducted without a decrease in workability. Therefore, the rubber composition is widely used for various types of pneumatic tires having excellent wet skid resistance, low rolling resistance, and abrasion resistance.

What is claimed is:

1. A rubber composition which comprises:

a blend rubber of a copolymer and other diene based rubbers, the copolymer comprising a bond between tin and a butadienyl group in the main chain and being obtained by copolymerization of 1,3-butadiene and an aromatic vinylmonomer using an organo lithium compound as an initiator, adding a halogenated tin compound thereto and effecting a coupling reaction, the glass transition point of the copolymer being −50° C. or higher, and the blend rubber comprising the copolymer in an amount of 20 parts by weight or more and the other diene based rubbers in an amount of 80 parts by weight or less per 100 parts by weight of the blend rubber;

silica filler in an amount of 10 to 80 parts by weight per 100 parts by weight of the blend rubber;

carbon black in an amount of 20 to 80 parts by weight per 100 parts by weight of the blend rubber, and in an amount of 1 to 20% of by weight of the amount of silica, a silane coupling agent represented by following general formula (1):

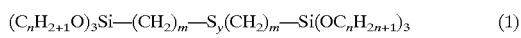

$$(C_nH_{2n+1}O)_3Si-(CH_2)_m-S_y(CH_2)_m-Si(OC_nH_{2n+1})_3 \quad (1)$$

wherein n represents an integer of 1 to 3, m represents an integer of 1 to 9, y represents a positive number of 1 or more and has a distribution, and in which the content of trisulfide silane component, where y is 3, is 20% or more based on the entire amount of the silane coupling agent, and the content of high polysulfide silane components, where y is 5 or a number greater than 5, is 50% or less based on the entire amount of the silane coupling agent.

2. A rubber composition according to claim 1, wherein the amount of silica filler is 15 to 60 parts by weight per 100 parts by weight of the blend rubber.

3. A rubber composition according to claim 1, wherein the amount of carbon black is 20 to 60 parts by weight per 100 parts by weight of the blend rubber.

4. A rubber composition according to claim 1, wherein the copolymer is a silane compound modified copolymer which is obtained by reacting the polymerization active terminal of the copolymer with an alkoxysilane compound.

5. A rubber composition according to claim 4, wherein the alkoxysilane compound is a silane compound which comprises at least one alkoxy group in one molecule and is represented by the following general formula (2):

$$X_pSi(OR)_TR'_{4-P-T} \quad (2)$$

(wherein, X is a halogen atom which is either a chlorine atom, a bromine atom, or an iodine atom, R and R' each independently are either an alkyl group, an aryl group, or a halogenated aryl group having 1 to 20 carbon atoms, T is an integer of 1 to 4, P is an integer of 0 to 2, and the sum of P and T is 2 to 4).

6. A rubber composition according to claim 5, wherein the alkoxysilane compound is one member selected from the group consisting of monoalkyltriaryloxysilane and tetraaryloxysilane.

7. A rubber composition according to claim 1, wherein the amount of silane coupling agent is 3 to 15% by weight of the amount of silica.

8. A rubber composition according to claim 1, wherein the content of trisulfide silane component, where y is 3, is 30% or more based on the entire amount of the silane coupling agent, and the content of the high polysulfide silane components, where y represents 5 or a number greater than 5, is 40% or less based on the entire amount of the silane coupling agent.

9. A rubber composition according to claim 1, wherein a nitrogen absorption specific surface area ($N_2SA$) of the carbon black is 70 to 150 $m^2$/g and a dibutyl phthalate oil absorption (DBP) of the carbon b lack is 120 to 200 ml/100 g.

10. A rubber composition according to claim 1, wherein the sum of the amount of carbon black and the amount of silica is 30 to 120 parts by weight per 100 parts by weight of the blend rubber, and a weight ratio of the amount of the carbon black to the amount of the silica is 1:0.5 to 1:15.

11. A pneumatic tire which is manufactured by using the rubber composition described in claim 1 for tread rubber.

12. A pneumatic tire which is manufactured by using the rubber composition described in claim 4 for tread rubber.

13. A pneumatic tire which is manufactured by using the rubber composition described in claim 5 for tread rubber.

14. A pneumatic tire which is manufactured by using the rubber composition described in claim 9 for tread rubber.

15. A pneumatic tire which is manufactured by using the rubber composition described in claim 10 for tread rubber.

16. A rubber composition according to claim 1, wherein the content of the trisulfide silane component, where y is 3, is 25% or more based on the entire amount of the silane coupling agent.

* * * * *